(12) United States Patent
Newman

(10) Patent No.: US 10,275,400 B1
(45) Date of Patent: Apr. 30, 2019

(54) SYSTEMS AND METHODS FOR FORMING A FAULT-TOLERANT FEDERATED DISTRIBUTED DATABASE

(71) Applicant: XANADU BIG DATA, LLC, Lexington, MA (US)

(72) Inventor: Rhys Andrew Newman, Perth (AU)

(73) Assignee: XANADU BIG DATA, LLC, Lexington, MA (US)

( * ) Notice: Subject to any disclaimer, the term of this patent is extended or adjusted under 35 U.S.C. 154(b) by 0 days.

(21) Appl. No.: 15/950,909

(22) Filed: Apr. 11, 2018

(51) Int. Cl.
*G06F 16/23* (2019.01)
*G06F 16/27* (2019.01)
*G06F 16/25* (2019.01)
*G06F 16/2458* (2019.01)

(52) U.S. Cl.
CPC ...... *G06F 16/2365* (2019.01); *G06F 16/2477* (2019.01); *G06F 16/256* (2019.01); *G06F 16/27* (2019.01)

(58) Field of Classification Search
None
See application file for complete search history.

(56) References Cited

U.S. PATENT DOCUMENTS

| | | | | |
|---|---|---|---|---|
| 2018/0063238 | A1* | 3/2018 | Zhang | H04L 67/1051 |
| 2018/0144156 | A1* | 5/2018 | Marin | G06F 21/31 |
| 2018/0152289 | A1* | 5/2018 | Hunt | H04L 9/0637 |

FOREIGN PATENT DOCUMENTS

WO 2017109140 A1 6/2017

* cited by examiner

*Primary Examiner* — Amresh Singh
(74) *Attorney, Agent, or Firm* — Womble Bond Dickinson (US) LLP; John J. Penny, Jr.

(57) ABSTRACT

The present disclosure provides a method for forming a fault-tolerant federated distributed database system, wherein the federated distributed database system includes a plurality of globally distributed local agreement groups, each globally distributed local agreement group including a plurality of computing nodes. The method includes storing data in each computing node in accordance with a temporal data model, a block corresponding to the temporal data model storing one or more keys, and time value and data reference value corresponding to each key, wherein the time value determines a point in time at which corresponding key is assigned corresponding data reference value. Then, for each globally distributed local agreement group, one or more blocks of corresponding computing nodes are updated, by updating state of corresponding one or more keys simultaneously using a local agreement algorithm. Further, for each globally distributed local agreement group, one or more updated blocks of the one or more corresponding computing nodes are combined to form a corresponding combined block of key edits. Furthermore, one or more key edits of combined blocks of the plurality of globally distributed local agreement groups are being agreed upon based on a pre-defined range of time and keys, using a global distributed agreement algorithm.

20 Claims, 4 Drawing Sheets

Exemplary Tables

| String | Time | Data Reference |
|--------|----------|----------------|
| Key1   | 28742834 | ABF878329      |
| Key2   | 28742801 | ABF878329      |
| Key1   | 28742800 | 992BAF879      |

| Data Reference | Data Bytes |
|----------------|------------|
| ABF878329      | 9384294795739535793584395837539583538 |
| 992BAF879      | 8378594357300001 |

FIG.2

SYSTEMS AND METHODS FOR FORMING A FAULT-TOLERANT FEDERATED DISTRIBUTED DATABASE

TECHNICAL FIELD

The present disclosure generally relates to the field of databases, and in particular, the present disclosure relates to methods and systems for forming a fault-tolerant federated distributed database

BACKGROUND

In a distributed storage system, data as a whole or different portions of the data is spread over and stored in several physically separate computer storage servers (also known as storage nodes) of a distributed storage system. The total storage capacity of the distributed storage system is designed to be much greater than that of a single storage node. Presently, some NoSQL (or non-SQL) databases have emerged as examples of large-scale distributed databases, where every single item or entry in the database system is stored as an attribute name (or key), together with its respective value. The simplest type is known as a key-→value store, where the fixed data "key" can be used to store and then retrieve a value. The value can be a fixed bit-length reference pointing to data or data in bytes.

Highly distributed databases ideally need to present a uniform and consistent state of their stored data to all clients and at all times. Modifications to data need to be handled carefully to ensure all clients get a consistent picture of the data. When a system is comprised of many physically separate servers with unreliable network connections, it becomes increasingly difficult to handle system-wide (e.g., global) atomic updates to data because nodes may fail randomly at any time (e.g., temporarily or permanently).

In view of the above, there is a need for efficient methods and systems to form a highly distributed database management system that provide atomicity, consistency, isolation and durability (ACID) properties on top of key-value data models, without limiting the speed of the system. There is also a need for such systems to maintain the illusion or appearance of a globally consistent, fault-tolerant, federated distributed database system.

SUMMARY

An embodiment of the present disclosure provides a method for forming a fault-tolerant federated distributed database system, wherein the federated distributed database system includes a plurality of globally distributed local agreement groups, each globally distributed local agreement group including a plurality of computing nodes. The method includes storing data in each computing node in accordance with a temporal data model, a block corresponding to the temporal data model storing one or more keys, and time value and data reference value corresponding to each key, wherein the time value determines a point in time at which corresponding key is assigned corresponding data reference value. For each globally distributed local agreement group, one or more blocks of corresponding computing nodes are updated, by updating state of corresponding one or more keys simultaneously using a local agreement algorithm. Further, for each globally distributed local agreement group, one or more updated blocks of the one or more corresponding computing nodes are combined to form a corresponding combined block of key edits. Furthermore, one or more key edits of combined blocks of the plurality of globally distributed local agreement groups are being agreed upon based on a pre-defined range of time and keys, using a global distributed agreement algorithm.

Another embodiment of the present disclosure provides a system for forming a fault-tolerant federated distributed database system. The federated distributed database system includes a plurality of globally distributed local agreement groups, each globally distributed local agreement group including a plurality of computing nodes. The system includes a data storing module for storing data in each computing node in accordance with a temporal data model, a block corresponding to the temporal data model storing one or more keys, and time value and data reference value corresponding to each key, wherein the time value determines a point in time at which corresponding key is assigned corresponding data reference value. The system further includes a data updating module for updating, for each globally distributed local agreement group, one or more blocks of corresponding computing nodes, by updating state of corresponding one or more keys simultaneously using a local agreement algorithm. The system furthermore includes a data processing module for combining, for each globally distributed local agreement group, one or more updated blocks of the one or more corresponding computing nodes to form a corresponding combined block of key edits. The system furthermore includes a data agreement module for globally agreeing to one or more key edits of combined blocks of the plurality of globally distributed local agreement groups, based on a pre-defined range of time and keys, using a global distributed agreement algorithm.

BRIEF DESCRIPTION OF DRAWINGS

FIG. 2 shows an exemplary data model depicting key values, data references and time values, according to an embodiment of the present disclosure;

DETAILED DESCRIPTION

Figure 1:
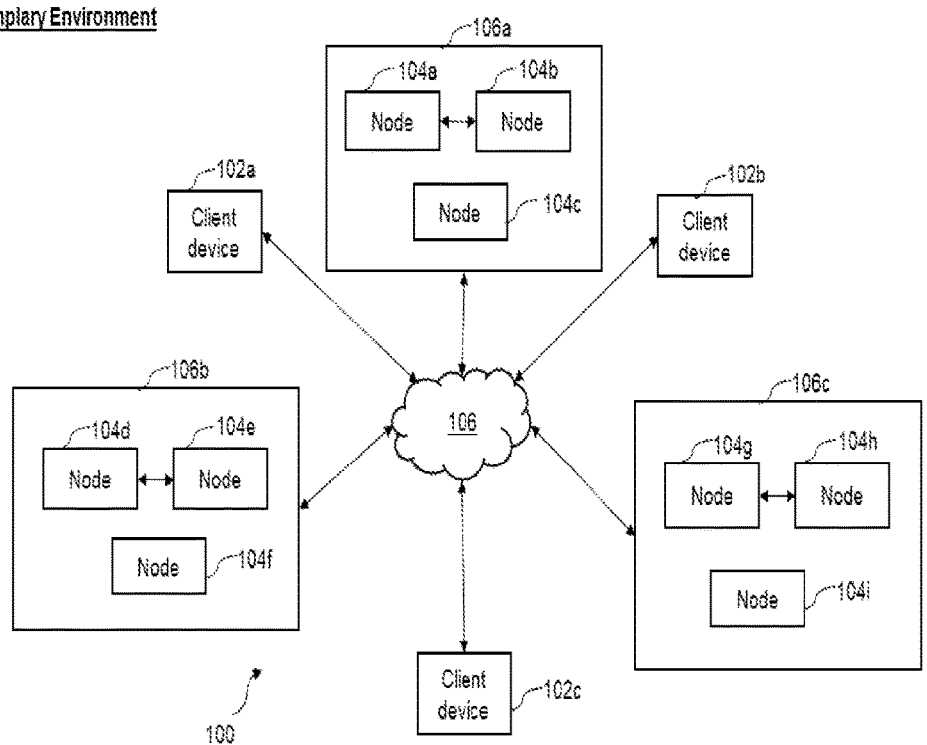
FIG. 1 illustrates an exemplary environment, wherein various embodiments of the present disclosure can be practiced.

The present disclosure will now be described more fully with reference to the accompanying drawings, in which embodiments of the present disclosure are shown. However, this disclosure should not be construed as limited to the embodiments set forth herein. Rather, these embodiments are provided so that this disclosure will be more thorough and complete, and will more fully convey the scope of the present disclosure to those skilled in the art. Like numbers refer to like elements throughout.

In many distributed database systems, a group of, for example, three or five nodes have been used to form a PAXOS group and thus provide fault tolerant distributed agreement of updates to data. However when a system scales to encompass an extremely large number of keys and values, and when the query and/or edit rate grows in tandem with the data stored, these three to five nodes in the agreement group can become overloaded and become the bottleneck to further scale the system. Further, core to these agreement systems is the idea of a quorum—more than 50% of the number of nodes taking part in a vote on a data value must agree for the data modification to be accepted. For example with three nodes in a group, at least two must confirm and accept an edit for it to be accepted by the system globally. This does allow one node to have failed (or the network connection to it to have failed) and the agreement can still continue. Thus, to be tolerant to N failures, a group needs to have or be formed of 2N+1 nodes. However, the larger the agreement group, the more complex network interactions are needed.

One approach to mitigate this problem is to distribute the task of agreeing upon updates to keys to more than just one PAXOS group of three to five nodes. For example all keys from "a" to "m" could be managed by a first PAXOS group of nodes 1,2,3 and keys from "n" to "z" can be managed by a second PAXOS group of nodes 4,5,6. Even though this technique spreads out the load over the key space, it makes it very difficult to achieve an atomic transaction that includes keys from different key ranges. For example, if all key updates were handled by just one agreement group, a bulk block of updates could be written and agreed in the normal way just like a single key update (e.g., the nodes would all agree or reject the update and the result would appear to clients as atomic). However with keys from different ranges, multiple PAXOS groups would then have to coordinate a two or more level PAXOS agreement, which becomes complicated and time consuming.

In some embodiments, a distributed database system could use three node PAXOS groups for key updates, but could also reassign the agreement responsibility to other nodes if a node in this agreement group fails. This presents a new set of issues as the process of reliably agreeing to shift to a new group must itself be the subject of a distributed agreement, which may be difficult or impossible due to node failure. For example, assume that there are three PAXOS groups of three nodes each (e.g., nine nodes in total), and that the system is configured to use each of these groups in a round-robin manner. If one of these groups suffers two failed nodes, then only the one remaining group will be unable to achieve agreements. At the specified trigger, the system moves to one of the other groups where it is then able to proceed, so that the system is only blocked for a short period of time.

Alternatively, the agreement groups can be used in a constant cycles for a fixed time—e.g., for one second each. The system is thus unable to write updates for one second out of every three. This is a 30% drop in performance but the system can still make some progress with up to four nodes out of nine having failed. This scheme is however vulnerable to inconsistencies in the face of serious network partitions, where clients can "see" nodes but the nodes themselves cannot see all of the rest of the nodes. In this case a "split-brain" may occur with nodes on each side of the partition agreeing to blocks of edits without the other side being fully aware of them.

A more sophisticated scheme is to allocate a group of three nodes with a lease that can be handed onto another group in the case of a single failure. With three nodes in a group, the remaining two nodes can quickly agree to stop handling updates and send all current updates together with a transfer request to the next group. Thus, the new group can take over the agreement role. In this way the system can tolerate failures out of nine, as long as failures cascade rather than being coincident. However, for very large systems, the probability of two coincident failures becomes more likely, and so the system is more likely to become unable to accept writes because two of the nodes in the PAXOS agreement group fail. Mitigating this by using a five node PAXOS group helps with failure tolerance, but makes the writing processes slower as more nodes have to participate in every agreement.

Thus, to overcome and/or minimize the above mentioned challenges (e.g., forming a globally consistent, fault-tolerant federated distributed data base system), embodiments of the present disclosure provide a new composite technology (combining blockchain consensus protocols (e.g., Ripple) and distributed data base system consensus protocols (e.g., PAXOS)). By using blockchain consensus protocols at the large scale, but distributed data base system consensus protocols at the local scale, we get the best balance of local speed yet global scale. A full blockchain only database is relatively slow for local (simple) transactions, where distributed data base system consensus protocols database would perform better and faster. For example, when there are multiple local agreement groups each having multiple servers, within each local agreement group a PAXOS agreement protocol is used for fast local agreement. In turn, each local agreement group can be joined together in a federated type of system, where a Ripple-like consensus is or can be used. This allows users to start small and then join groups together at a later time. For example, several divisions in different countries can connect their individual local agreement groups together with the federation layer. Embodiments of the present disclosure offer a globally robust federation model on top of the numerous benefits of the conventional NoSQL key→value store.

Current blockchain systems aim for centralized agreement over a distributed system of storage. That is there are (potentially) many copies of the chain of blocks, often available to the public, as a proof of certain transactions linking together in an uninterrupted and publicly verifiable form (i.e. using public key cryptography to create digital signatures that prove the authenticity of transactions linked into the chain). The difference here, with the proposed composite technology, is that there are a number of locally atomic agreement systems that use a "Ripple-like" system for getting distributed agreement globally amongst a potentially large number of such systems without all systems having to coordinate their agreement or trust any particular central authority/system. This combination of local, synchronous, atomic agreement processes with more global agreement protocols enables system architects to choose a middle ground in terms of agreement where local systems will agree with fast, atomic updates but where global scale requires slower longer timescale processes that again need to be distributed without any central authority (that would be a performance bottleneck and/or security risk).

As described herein, the unique (key, time)→reference data model of server nodes lends itself to treatment or implementation with blockchain techniques so that a much higher level of fault tolerance can be achieved in a very large distributed database system, without the need to use specialized hardware. In some embodiments described herein, a local distributed agreement algorithm (e.g., PAXOS) can be applied with a global agreement technique (e.g., Ripple), and thereby a federated database system can be created having the best performance over multiple use cases and scales.

Key updates can be handled among the nodes within each local agreement group using a distributed and fault-tolerant agreement algorithm, such as the PAXOS algorithm. The distributed and fault-tolerant agreement PAXOS algorithm provides a distributed ACID guarantee for all keys. The distributed agreement of key updates is fast due to the small amount of data that needs to be agreed upon (e.g., only the new, small, fixed bit-length data reference value for each key). Further, while the nodes are agreeing to results according to a global agreement algorithm such as Ripple, the time-dependent nature of the data model of the nodes allows other nodes to understand or identify what the best (and consistent) state of the global system is at all times. Because the key updates of each node are small (e.g., 32 bytes each), an agreement algorithm such as Ripple is well suited to agree upon a block of key edits at a global scale. For transactions at this scale, it is assumed that, for example, a ~10 s wait for confirmation at a global level would be acceptable.

FIG. 1 illustrates an exemplary environment 100, wherein various embodiments of the present disclosure can be practiced. The environment 100 includes first, second and third client computing devices 102a, 102b and 102c (hereinafter, collectively referred to as "client devices 102"), and first through ninth server computing nodes 104a to 104f (hereinafter, collectively referred to as "nodes 104"), communicatively coupled to each other through a communication network 106.

The communication network 106 may be any suitable wired network, wireless network, a combination of these or any other conventional network, without limiting the scope of the present disclosure. Few examples, the network 106 can be or include a Local Area Network (LAN), wireless LAN connection, an Internet connection, a point-to-point connection, or other network connection and combinations thereof. The communication network 106 may be any other type of network that is capable of transmitting or receiving data to/from host computers, storage devices, personal devices, telephones, video/image capturing devices, video/image servers, or any other electronic devices. Further, the communication network 106 may be capable of transmitting/sending data between the mentioned devices. Additionally, the communication network 106 may be a local, regional, or global communication network, for example, an enterprise telecommunication network, the Internet, a global mobile communication network, or any combination of similar networks. The communication network 106 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The communication network 106 may include any software, hardware, or computer applications that can provide a medium to exchange signals or data in any of the formats known in the art, related art, or developed later. The number of client devices 102 and server nodes 104 shown are exemplary in nature, and more nodes 104 can be added to the network as and when required or desired to increase throughput and capacity. Each server node 104 may have similar structural and functional details but may also differ from one another.

The client devices 102 may be used by the users for their day-to-day tasks such as emails, surfing, social networking, and the like. Examples of the client devices 102 include, but are not limited to, cell phones, personal digital assistants (PDAs), computers, servers, laptop computers, tablets, Internet appliances, smart phones, and mainframe computers. The nodes 104 may be storage devices or a set of closely-linked database servers or block chain servers. Each node 104 may be controlled by a person or organization. The nodes 104 may store and process data in various forms, such as raw data (e.g., data collected from sensors, a traffic monitoring system, control systems, a surveillance system, a security system, a toll fee system, or the like), processed data (e.g., metrics or other results generated from raw data, data aggregations, filtered data, or the like.), developed content (e.g., documents, photographs, video, audio, etc.), and/or the like.

The client devices 102 and the nodes 104 may be distributed geographically worldwide across different countries, regions, states, and the like. All or a portion of the client devices 102 may be located remotely from the nodes 104, while in some embodiments, all or a portion of the client devices 102 may be located locally. The client devices 102 may be configured to perform a number of transactions or operations such as creating, inserting, reading (querying or accessing), updating, deleting and the like, as known to those skilled in the art. For example, the client devices 102 may access data stored in or throughout the nodes 104. In other examples, the client devices 102 may write and read data to and from the nodes 104. Further, the client devices 102 may be used by one or more respective users to retrieve data, and/or may be used by one or more "administrator" users to store data, create one or more data entries, and the like. In some embodiment of the present disclosure, each node 104 may be identified by a unique identifier (ID) (e.g., a node ID) for identification by the client devices 102.

In some embodiments, the first through third nodes 104a to 104c may be distributed locally, and form a first local agreement group. Similarly, the fourth through sixth server 104d to 104f may be distributed locally, and form a second local agreement group 106b, and the fifth through seventh nodes 104g to 104i may be distributed locally, and form a third local agreement group 106c. The first, second and third local agreement groups 106a, 106b and 106c are hereinafter collectively referred to as "globally distributed local agreement groups 106."

The nodes 104 within each local agreement group 106 can provide fault tolerant distributed agreement of updates of data to each other according to the PAXOS agreement protocol. Further, the local agreement groups 106 can globally agree to updates with other local agreement groups based on a blockchain distributed ledger technology (e.g., Ripple protocol). As known to those of skill in the art, the environment 100 may include more than three local agreement groups 106, and each local agreement group 106 may include more than three nodes 104.

It should be understood that the present disclosure may be implemented for any environment having multiple server nodes. Moreover, it should be understood that the various environments discussed herein including with reference to FIG. 1 may be implemented for other environments that are not mentioned herein.

In some embodiments, data may be stored on each node 104 in accordance with a key-value temporal data model 200 described herein in detail with reference to FIG. 2. According to the key-value temporal data model 200, the data is stored in a timeline store 202 and a data store 204. The data store 204 stores actual data bytes 206 and fixed bit data references 208 corresponding to the stored data 206. In some embodiments, a data reference is a hash code of data bytesgenerated using a hashing algorithm on corresponding data. Various examples of hashing algorithms include, for example, MD5, SHA-1, SHA-256, SHA-384 or a combination thereof.

The timeline store 202 can store various key values 210, various time values 208 indicating the time when a corresponding key is mapped or assigned to data, and various data reference values 208 that point to the databytes 206 assigned or mapped to corresponding keys 210. In some embodiments, the key values 210 are identifying strings and can be human readable. Further, a time value 208 can be made up of the clock combined with a node ID encoded into the lowest bits, as well as a sequence number optionally included in other (low order) bits. Thus, the timeline store 202 includes a time-ordered list of data entries (e.g., (data reference, time) pairs that map keys to data (via its reference or address) at a specific time.

In operation, when a key is updated during a transaction among the nodes 104, a new entry is appended to corresponding timeline store 202 with a reference to the new data. The actual data is stored separately in the data store 204, which uses deduplication to preferentially return references for inclusion in the timeline store 202 that refer to data that has been stored previously (in a scalable and distributed manner). This means that multiple copies of data need not be stored unnecessarily.

Referring back to FIG. 1, the key updates are handled among the nodes 104 within each local agreement group 106 using a distributed and fault-tolerant agreement algorithm such as the PAXOS algorithm. The distributed and fault-tolerant agreement PAXOS algorithm provides a distributed ACID guarantee for all keys. The distributed agreement of key updates is fast due to the small amount of data that needs to be agreed upon (e.g., only the new, small, fixed bit-length data reference value for a key). The small fixed length of the data references in the timeline store 202 mean that entries can be read and written at extremely high speed. The timeline store 202 may be loaded in a main memory (RAM) of the nodes 104 in the fastest possible response time. The entire history of the string space (including at all times) in all practical applications can be held in memory (e.g., nodes with many GB of RAM can hold billions of updates and their histories) and thus complex queries over key ranges and time periods can be handled quickly.

Thus, a (key, data reference, time) tuple is unique as the system maintains time stream of all edits (which can also be referred to as a data history). The data model allows arbitrary ranges of keys and times to be specified in client queries, make it possible to perform consistent multi-key transactional updates, and further perform range (in time and key space) based "Compare and Set" operations—e.g., a concurrent update to a number of keys (e.g. at a specific time—implicitly the transaction time) conditioned on there being no edits within a specified (key, time) range.

Figure 3:
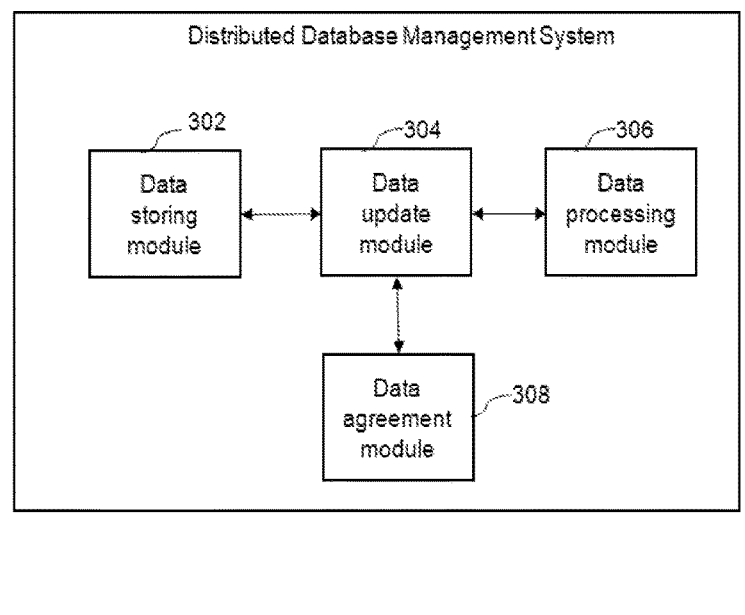
FIG. 3 illustrates a system for forming a fault-tolerant federated distributed database system in accordance with an embodiment of the present disclosure.

FIG. 3 illustrates a system 300 for forming a fault-tolerant federated distributed database system in accordance with an embodiment of the present disclosure. The system 300 includes a data storing module 302, a data update module 304, a data processing module 306, and a data agreement module 308. In an embodiment, the system 300 may consists of a core set of platform API definitions that are composable architecture elements in order to be integrated with other big data system elements such as IT infrastructure and data analytics to satisfy specific big data use requirements. Each of the system components 302-308 may be implemented in a single computing device or multiple computing devices connected to each other via a communication bus known to those of skill in the art or later developed. Further, the components 302-308 may be in the form of hardware components, while in another exemplary embodiment, the components 302-308 may be in the form of software entities/modules. In yet another exemplary embodiment, the components may be a combination of hardware and software modules.

The data storing module 302 is configured to store data at each node 104 (as illustrated with reference to FIG. 1) in accordance with a temporal data model (as illustrated with reference to FIG. 2). In an embodiment, a block of data corresponding to the temporal data model stores one or more keys, and time value and data reference value corresponding to each key. The time value determines a point in time at which a data reference value is assigned to a corresponding key. In some embodiments, each node 104 within a local agreement group 106 has a similar pre-defined key range for storing corresponding time values and data reference values. For example, when the first node 104a uses keys 'a' to 'm' for storing data and time values, the second and third nodes 104b and 104c also use keys 'a' to 'm' for storing data and time values. The pre-defined key range for the nodes 104 of a local agreement group 106 may be defined at the design time. In some embodiments, at a global scale, each local agreement group 106 may be referred to as a domain group of servers, each of which can store data at a specified key range. Each local agreement group 106 may be hereinafter referred to interchangeably as a transactional domain. The local agreement group 106 can be referred to as a transactional domain, because only within a local agreement group, ACID updates are obtained to the keys covered by that group, hence they form a transaction domain in the key-space.

For each local agreement group 106, the data update module 304 is configured to reliably update one or more blocks of data of all nodes 104 simultaneously (or substantially simultaneously), by updating the state of one or more keys using the PAXOS agreement algorithm during a transaction request. In some embodiments, the updates to the key values may be managed based on a pre-defined condition specified within a transaction request. This pre-condition range is specified using (key, time) ranges. The pre-defined condition is to check if an update to the key-time ranges specified has occurred in the time since the transaction was created but before it could be applied to the database store. For example, if there is an edit/update within the key-time range specified in the transaction domain, then an update to the key references will not occur. Within a transaction domain, keys (or groups of keys in the same domain) can be updated reliably using PAXOS. This scales well up to a point and has the advantage of being very fast (about 1000 s of updates/second).

For each local agreement group 106, the data processing module 306 is configured to combine updated blocks of each node 104 to form a combined block of key edits. For example, three updated blocks of the first, second and third nodes 104a, 104b and 104c updated locally using PAXOS agreement are combined to form a first combined block of key edits of a pre-defined size. Thus, the data processing module 306 generates a combined block of key edits for each local agreement group 106, which are subsequently used for a wider global agreement. In an example, the (key, time, data references) logs are a write-once series of edits to the state of keys, and as such has the same incremental log structure as a series of financial transactions. Therefore, the combined blocks of key edits may be used for the wider global agreement among the local agreement groups using a blockchain based global agreement algorithm.

The data agreement module 308 is configured to enable a global agreement among the local agreement groups 106 regarding one or more key edits of one or more combined blocks, based on a pre-defined range of time and keys, using a global agreement algorithm. In an example, the global agreement algorithm is based on a blockchain distributed ledger technology such as Ripple protocol. In an embodiment, the Ripple protocol or the like is used to manage simultaneous updates of keys obtained from or corresponding to one or more globally distributed local agreement groups 106, thereby offering global cross domain transactions at a delay of few seconds.

Ripple is a blockchain distributed ledger technology that achieves consensus agreement over a globally distributed set of participating nodes in the face of multiple failures (even if some nodes are acting maliciously to disrupt the values and/or agreement thereof). It achieves this by cycling through rounds of a fixed time window (configured at install time) with each node accepting proposals if its personalized "trusted set" of reference servers accepts the proposal. With multiple overlapping trust sets, and multiple messages that attempt to generate system wide agreement by constantly asking nodes to flip to the acceptance state of their trust set, it is easy to see that the whole distributed system may rapidly converge to a global accept or global reject of a block of key-value edits. Ripple sacrifices speed of updates for very robust and highly fault-tolerant agreement. A Ripple "round" duration must be some multiple of the maximum clock skew of systems participating, and for global finance applications there is currently one round every ~10 seconds.

As with most blockchain technologies, the client devices 102 see a consistent and durable set of edits in a distributed ledger (similar to the temporal data model 'distributed key→preference log'), but not all the client devices 102 may see the latest log entries at the same time. This lack of simultaneity has limited the application of block chains to the distributed databases such as RDMBs and NoSQL, as agreement achieved with blockchains is either not consistent (some clients see older data before the updates can be applied everywhere) or slow as systems are forced to wait for all nodes in the system to capture the change.

The temporal data model of the present disclosure permits the concept of issuing a key's value at a substantially similar time. The client devices 102 asking for the current value of a key are informed as to what the latest updated value for that key is, which could be a value from a previous time some time ago. The client devices 102 thus have to decide whether the age of that information is acceptable or whether to wait a known time before checking whether the value has been updated by a transaction agreed by other nodes 104.

Accordingly, in some embodiments, while the nodes 104 are in the middle of agreeing to results according to a global agreement algorithm such as Ripple, the time-dependent nature of the data model of the nodes 104 allows other nodes 104 to understand what the best (and consistent) state of the global system is at all times. Since, the key updates of each node 104 are small (e.g., 32 bytes each), Ripple is ideally suited to agree to a block of key edits at a global scale. For transactions at this scale, it is assumed that a ~10 s wait or the like for confirmation at a global level would be acceptable, and at a local level, key updates may be recorded using PAXOS at a much higher volume.

Figure 4:
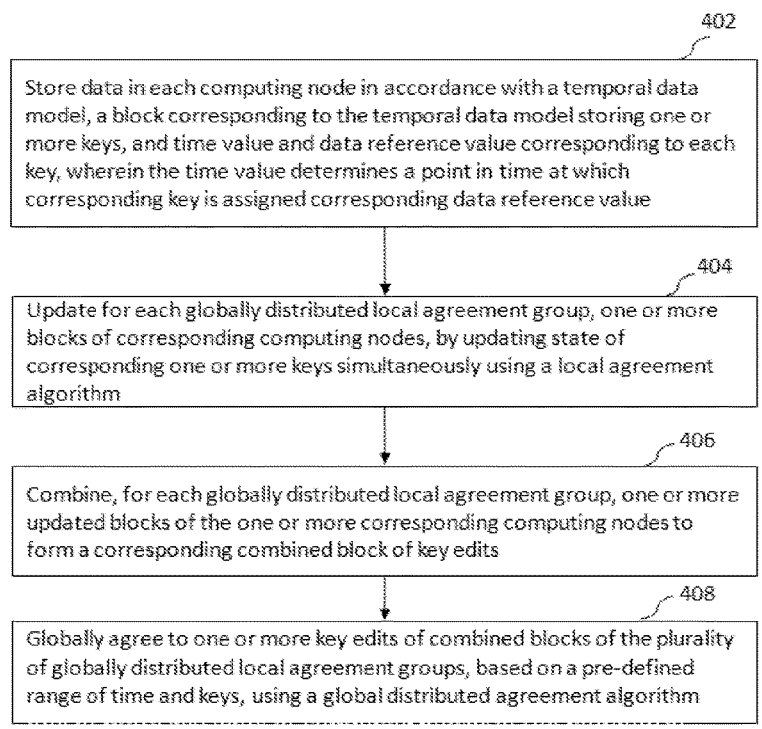
FIG. 4 is a method flowchart for forming a fault-tolerant federated distributed database system in accordance with an embodiment of the present disclosure.

FIG. 4 is a method flowchart for managing data updates and agreements across the nodes 104 in accordance with an embodiment of the present disclosure. The method is discussed with respect to creation as well as management or handling of the database (e.g., retrieval of data, executing transactions such as insert, delete, update, add or the like). Some steps may be discussed with respect to creation of database entries in accordance with a temporal data model disclosed in FIG. 2, and some steps may be discussed with respect to the environment illustrated in FIG. 1.

At step 402, the data is stored in each node in accordance with a temporal data model. A block corresponding to the temporal data model stores one or more key values, and time value and data reference values corresponding to each key. The time value determines a point in time at which corresponding data reference value is assigned to a corresponding key.

At step 404, one or more blocks of each node within a local agreement group are updated, by updating the state of one or more keys using a local agreement algorithm. The local agreement can be performed using, for example, the PAXOS algorithm. Each node of the local agreement group can be configured to execute a large number of key updates per second (e.g., 1000) using the PAXOS algorithm or the like. In some embodiments, the updates are triggered by the users and applications that change the data values in the distributed data storage system.

At step 406, for each local agreement group, updated blocks of each computing node are combined to form a combined block of key edits, thereby generating a combined block of key edits for each local agreement group.

At step 408, one or more key edits of the combined blocks are globally agreed upon by the local agreement groups based on a pre-defined range of time and keys, using a global distributed agreement algorithm. The global distributed agreement algorithm can be based on a blockchain distributed ledger technology, such as the Ripple protocol that is used to manage simultaneous updates of keys coming from one or more globally distributed domain groups, thereby offering global cross domain transactions at a short delay (e.g., a few seconds). Further, the time-dependent nature of data model of each node facilitates determining the consistent state of the fault-tolerant federated distributed database system at every time instant.

In some example embodiments, a client may wish to change the values of keys A and B to 50 and 34 respectively. With A and B in separate transaction groups, these instructions go to or correspond to different PAXOS groups for local updates. After several independent (local) updates, the local groups create a ratification document that connects updates in the two domains together. This document is then agreed upon using a global consensus (e.g., Ripple) so that the local updates (A=50) becomes valid only if all nodes (e.g., via Ripple) have also agreed that (B=34), and vice versa. Each local transaction group can then use these supplemental ratification documents to confirm their local updates (or reverse them if not globally agreed). Here, ratification document and supplemental ratification document are the same thing—the word "supplemental" in the second usage is just used to emphasize these documents contains statements about agreements of *other* documents that contain directives about data updates, rather than agreements on data updates directly.

Ripple protocol proceeds to global consensus by each system in sub-groups of the total number of nodes in the global system voting for the dominant decision within their local trusted set. For example if system E trusts A, B, C and D; and system G trusts A, B, E, F; then if A, B, C, D vote to accept a decision then E will also (majority vote in E's trusted group). As a result G will also accept the result (because A, B, E do—leaving F to agree on its own). The majority in each attempt must be 80% of the trusted set of each node. To use this approach, each local PAXOS group agrees a new proposed value in the normal fast ACID way, and then constructs a ratification document that states "Data update described in document 124234325 is agreed". This latter document is agreed via the ripple protocol, which by its nature could result in the document being closed as "not agreed". If this happens the original data update (in document 124234325) is not applied to the global blockchain of linked updates (a copy of which typically exists in each local database). As a side effect of the global Ripple protocol agreement these ratification documents are then either all agreed or denied, which leads to each local group using PAXOS again to fix the block-chain update in place in the correct way.

The present disclosure may be implemented in the form of a computer programmable product for managing data in a database in accordance with a data model. The computer programmable product includes a set of instructions, the set of instructions when executed by a processor causes the processor to perform the methods as discussed herein, including for example with reference to FIG. 4.

Use Cases & Implementation Examples

The present disclosure discloses methods and systems for forming a fault-tolerant federated distributed database system. The methods and systems provide a number of features such as (i) offering a familiar platform (e.g., NoSQL key-value store, with added timelines/histories) to build applications (including the option of layering on top other models such as the common "Relational" model that can support a full SQL storage and querying abilities); (ii) a platform where consistency and atomicity are supported; (iii) being able to rollback to any state (including specific times where the whole system's data is known to be at a stable/good state), thereby providing immunity from data loss; (iv) including inherent backups, thus removing the need to build and manage another set of backup technologies and processes; (v) being able to recover all data at all the times, thus satisfying onerous data retention regulations automatically; and (vi) scaling horizontally to accommodate the big-data age. The present disclosure includes applying transactions in a distributed environment and obtaining ACID properties. The present disclosure uses a database management system that provides high availability, while maintaining data and transaction consistency, integrity, durability and fault tolerance.

Notably, the embodiments presented herein provide for the use of consensus or settlement algorithms or protocols (e.g., Ripple) with distributed databases generally, including those not directed to financial transactions. For example, when there are multiple local agreement groups, each group having multiple servers, then within each local agreement group, a PAXOS agreement protocol or the like are used for fast local agreement. Then, each local agreement group can be joined together in a federated type of system, where a consensus (e.g., Ripple-like consensus) is used. This allows users to start small and then join things together later. For example, several divisions in different countries can connect their individual local agreement groups together with the federation layer. In the context of a financial use, financial transactions are supported within a moderately trusted environment. In some embodiments described herein, disclosure offer a globally robust federation model on top of the numerous benefits of the conventional NoSQL key→value store. Moreover, in some embodiments, local distributed agreement algorithms (e.g., PAXOS) are applied in conjunction with global agreement techniques or protocols (e.g., Ripple), thereby creating a federated database system that has the best performance over multiple use cases and scales.

Large Super-Tolerant PAXOS Group

Methods and systems are described herein for forming a "configuration group," which is a large super-tolerant PAXOS group (e.g., perhaps with over nine nodes) and thus tolerant to more coincident failures (e.g., four coincident failures). When multi-key transactions are implemented, the present disclosure uses PAXOS groups with a dynamic movement of agreement groups (using a super-configuration PAXOS group) to manage load. This group's role is to agree which groups of three nodes form the current agreement group and for what key ranges. It is then possible to split agreement responsibilities for different key ranges but then alter these ranges dynamically in response to load and atomic transaction requirements. For example, if a transaction needs to atomically alter keys from two or more key ranges, the configuration group could be used to agree a range change that puts all the required keys into a single range—perhaps only temporarily in order to achieve the transaction. In this way, key ranges can be controlled dynamically to spread load (e.g., into multiple smaller PAXOS groups) but also provide global transactions on arbitrary sets of keys. As long as a three node PAXOS group can react to one failure within it and advise the configuration group of this state, the configuration group can reallocate responsibility and thus achieve scalability with very high tolerance to failures.

ACID Compliant Distributed Database Management System

To provide strong ACID compliance over multiple keys with higher performance capabilities, PAXOS consensus algorithm in combination with Ripple algorithm or another blockchain distributed consensus agreement technology or algorithm, is implemented. A distributed fault-tolerant high-speed ACID multi-key transactional data store combined with time-based historic updates can support high-performance micro services implementation. To provide defined key subspaces that support atomic multi-key operations, the present disclosure implements a distributed global consensus PAXOS algorithm.

Addressing Branching Problem in Blockchain Based Operations

To solve the branching problem in blockchain based operations, all "resources" that are controlled by a blockchain (e.g., the ownership of a particular item) are stored under a specific "key" in the timeline store. In the timeline store, the links of the growing chain can be stored against the same key each time. This prevents the "branching" of the chain for a resource, as everyone who wants to add a link will access the same "key" in the timeline store. Because the timeline store records all values in a timeline, then only the last "link" would need to be stored in the latest value of a key, as the previous links would be in the timeline store already. A conventional Key-Value store would have to store the ever-increasing chain under a single key, or have a rule to change the key name each time (e.g., KeyForObject.1->KeyForObject.2->KeyForObject.3 . . . ). Neither of these options work ideally for a conventional Key-Value store, but map very easily on the concept of a timeline store. The validity of the unbroken (unbranched) chain can be verified by any person with suitable access to the timeline store. Also the "lost link" problem becomes much less likely, as the timeline store provides for a conditional update with ACID properties. Thus the "final link" stored under a resource key (which is constant and all parties can determine the correct value for it—e.g., a hash of the object's description/name) will be managed by the PAXOS agreement system and therefore be highly resilient to failure. Losing a link is therefore extremely unlikely (e.g., can be made practically impossible with PAXOS group size of five). These properties make the timeline store an ideal underlying store for blockchain operations. Internal business processes that are moving into the blockchain space can be supported transparently by the fault tolerant federated distributed management system of the present disclosure.

The database management system as described in the herein or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the method of the present disclosure.

The distributed data storage system as described in the present disclosure or any of its components, may be embodied in the form of a computer system. Typical examples of a computer system includes a general-purpose computer, a sever computer, a programmed microprocessor, a micro-controller, a peripheral integrated circuit element, and other devices or arrangements of devices that are capable of implementing the method of the present disclosure.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks that constitute the method of the present disclosure. The set of instructions may be in the form of a software program. Further, the software may be in the form of a collection of separate programs, a program module with a larger program or a portion of a program module, as in the present disclosure. The software may also include modular programming in the form of object-oriented programming. The processing of input data by the processing machine may be in response to user commands, results of previous processing or a request made by another processing machine.

For a person skilled in the art, it is understood that these are exemplary case scenarios and exemplary snapshots discussed for understanding purposes, however, many variations to these can be implemented in order to detect objects (primarily human bodies) in video/image frames.

In the drawings and specification, there have been disclosed exemplary embodiments of the present disclosure. Although specific terms are employed, they are used in a generic and descriptive sense only and not for purposes of limitation, the scope of the present disclosure being defined by the following claims. Those skilled in the art will recognize that the present disclosure admits of a number of modifications, within the spirit and scope of the inventive concepts, and that it may be applied in numerous applications, only some of which have been described herein. It is intended by the following claims to claim all such modifications and variations which fall within the true scope of the present disclosure.

What is claimed is:

1. A method of forming a fault-tolerant federated distributed database system, wherein the federated distributed database system includes a plurality of globally distributed local agreement groups, each globally distributed local agreement group being responsible for storing a subset or block of a global keyspace and including a plurality of computing nodes, the method comprising:
    storing data in each computing node in accordance with a temporal data model, in which one or more keys and a sequence of time value and data reference value pairs for each key are stored, wherein each time value determines a point in time at which a corresponding key is assigned corresponding data reference value;
    updating, for each globally distributed local agreement group, by appending new time/reference pairs to the end of sequences of one or more keys simultaneously using a local agreement algorithm and contingent on there being no updates already applied in a pre-defined range of time and/or keys, or specified values being equal to latest values for the pre-defined range of time and/or keys;
    combining, for each globally distributed local agreement group, one or more blocks of updates applied to one or more keyspace subsets corresponding to the local agreement groups to form a corresponding combined block of key edits; and
    globally agreeing to apply the edits of one or more combined blocks of updates from one or more local groups covering corresponding keyspace subsets using a global distributed agreement algorithm.

2. The method as claimed in claim 1, wherein the local agreement algorithm is PAXOS algorithm.

3. The method as claimed in claim 1, wherein the global agreement algorithm is based on a blockchain distributed ledger technology.

4. The method as claimed in claim 3, wherein the blockchain distributed ledger technology is Ripple protocol that is used to manage simultaneous updates of keys coming from one or more globally distributed domain groups, thereby offering global cross domain transactions at a delay of few seconds.

5. The method as claimed in claim 1, wherein the time-dependent nature of data model of each computing node facilitates determining the consistent state of the fault-tolerant federated distributed database system at every time instant.

6. The method as claimed in claim 1 further comprising mapping each data reference with a data value of a block of data in a corresponding data store.

7. The method as claimed in claim 6, wherein the data store is a type of distributed NoSQL key-value store.

8. The method as claimed in claim 1, wherein the data reference is fixed bit-length data, and the updates to one or more keys include updating corresponding fixed bit-length data references and corresponding time values.

9. The method as claimed in claim 1, wherein key updates of the first and second combined blocks are managed based on a pre-defined condition, wherein the pre-defined condition is to check if a key update is within the key-time range specified in a transaction request.

10. The method as claimed in claim 1 further comprising dynamically forming a local agreement group with a dynamic number of nodes and a dynamic key range determined in response to load and atomic transaction requirements.

11. The method as claimed in claim 1 further comprising storing one or more links of a growing chain against one of the keys in the temporal data model at different time instants, for blockchain based operations.

12. A system for forming a fault-tolerant federated distributed database system, wherein the federated distributed database system includes a plurality of globally distributed local agreement groups, each globally distributed local agreement group being responsible for storing a subset or block of a global keyspace including a plurality of computing nodes, the system comprising:
  a data storing module for storing data in each computing node in accordance with a temporal data model, in which one or more keys and a sequence of time value and data reference value pairs for each key are stored, wherein each time value determines a point in time at which a corresponding key is assigned corresponding data reference value;
  a data updating module for updating, for each globally distributed local agreement group, by appending new time/reference pairs to the end of sequences of one or more keys simultaneously using a local agreement algorithm and contingent on there being no updates already applied in a pre-defined range of time and/or keys, or specified values being equal to latest values for the pre-defined range of time and/or keys;
  a data processing module for combining, for each globally distributed local agreement group, one or more blocks of updates applied to one or more keyspace subsets corresponding to the local agreement groups to form a corresponding combined block of key edits; and
  a data agreement module for globally agreeing to apply the edits of one or more combined blocks of updates from one or more local groups covering corresponding keyspace subsets using a global distributed agreement algorithm.

13. The system as claimed in claim 12, wherein the local agreement algorithm is PAXOS algorithm.

14. The system as claimed in claim 12, wherein the global agreement algorithm is based on a blockchain distributed ledger technology.

15. The system as claimed in claim 14, wherein the blockchain distributed ledger technology is Ripple protocol that is used to manage simultaneous updates of keys coming from one or more globally distributed domain groups, thereby offering global cross domain transactions at a delay of few seconds.

16. The system as claimed in claim 12, wherein the time-dependent nature of data model of each computing node facilitates determining the consistent state of the fault-tolerant federated distributed database system at every time instant.

17. The system as claimed in claim 12, wherein the data reference is fixed bit-length data, and the updates to one or more keys include updating corresponding fixed bit-length data references and corresponding time values.

18. The system as claimed in claim 12, wherein key updates of the first and second combined blocks are managed based on a pre-defined condition, wherein the pre-defined condition is to check if a key updated is within the key-time range specified in a transaction request.

19. The system as claimed in claim 12, wherein the data storing module is former configured for forming a local agreement group with a dynamic number of nodes and a dynamic key range determined in response to load and atomic transaction requirements.

20. The system as claimed in claim 12, wherein the data storing module is further configured for storing one or more links of a growing chain against one of the keys in the temporal data model at different time instants, for blockchain based operations.

* * * * *